United States Patent
Choi et al.

(10) Patent No.: US 11,005,687 B2
(45) Date of Patent: May 11, 2021

(54) METHOD FOR TRANSMITTING SRS IN WIRELESS COMMUNICATION SYSTEM AND TERMINAL FOR SAME

(71) Applicant: LG ELECTRONICS INC., Seoul (KR)

(72) Inventors: Kukheon Choi, Seoul (KR); Suckchel Yang, Seoul (KR); Kyuhwan Kwak, Seoul (KR); Seonwook Kim, Seoul (KR); Jinyong Choi, Seoul (KR); Daesung Hwang, Seoul (KR); Seunggye Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/487,424

(22) PCT Filed: Feb. 21, 2017

(86) PCT No.: PCT/KR2017/001875
§ 371 (c)(1),
(2) Date: Aug. 20, 2019

(87) PCT Pub. No.: WO2018/155726
PCT Pub. Date: Aug. 30, 2018

(65) Prior Publication Data
US 2019/0379560 A1   Dec. 12, 2019

(51) Int. Cl.
*H04L 25/02* (2006.01)
*H04L 5/00* (2006.01)
(Continued)

(52) U.S. Cl.
CPC ........ *H04L 25/0226* (2013.01); *H04L 5/0051* (2013.01); *H04W 16/28* (2013.01); *H04W 72/0413* (2013.01); *H04W 72/0446* (2013.01)

(58) Field of Classification Search
CPC . H04L 25/0226; H04L 5/0051; H04L 5/0094; H04L 27/2602; H04L 27/261;
(Continued)

(56) References Cited

U.S. PATENT DOCUMENTS

| 2013/0039304 A1 | 2/2013 | Pan et al. |
| 2016/0150529 A1 | 5/2016 | Noh et al. |

(Continued)

FOREIGN PATENT DOCUMENTS

WO   2016163805   10/2016

OTHER PUBLICATIONS

R1-1701106;Title:UL SRS design considerations in NR; Source: Nokia, Alcatel-Lucent Shanghai Bell; 3GPP TSG RAN WG1 NR Ad-Hoc Meeting; Spokane, USA, Jan. 16-20, 2017; (Year: 2017).*
R1-1700019; Title: Multiplexing of UL control channel and SRS in NR; Source: Huawei, HiSilicon; 3GPP TSG RAN WG1 NR Ad-Hoc Meeting; Spokane, USA, Jan. 16-20, 2017 (Year: 2017).*
R1-1612073; Title: UL channelization in short UL duration; Source: Qualcomm Incorporated; 3GPP TSG-RAN WG1 #87, Nov. 14-18, 2016 Reno, U.S.A. (Year: 2016).*
(Continued)

*Primary Examiner* — Hassan A Phillips
*Assistant Examiner* — Mohammed S Chowdhury
(74) *Attorney, Agent, or Firm* — Lee, Hong, Degerman, Kang & Waimey PC

(57) ABSTRACT

A method for transmitting a sounding reference symbol (SRS) by a terminal in a wireless communication system can comprise the steps of: receiving, from a base station, control information comprising a first indicator for indicating localized SRS transmission; and transmitting a localized SRS in a particular symbol on the basis of the first indicator.

6 Claims, 10 Drawing Sheets

(51) Int. Cl.
*H04W 16/28* (2009.01)
*H04W 72/04* (2009.01)

(58) Field of Classification Search
CPC ............. H04W 16/28; H04W 72/0413; H04W 72/0446
See application file for complete search history.

(56) References Cited

U.S. PATENT DOCUMENTS

| | | | |
|---|---|---|---|
| 2017/0264402 A1* | 9/2017 | Papasakellariou .. | H04W 74/006 |
| 2018/0076917 A1* | 3/2018 | Pan ..................... | H04J 13/0062 |
| 2018/0097578 A1* | 4/2018 | Li ....................... | H04W 52/241 |
| 2018/0124815 A1* | 5/2018 | Papasakellariou .. | H04W 72/042 |
| 2018/0131425 A1* | 5/2018 | Li ....................... | H04W 72/1284 |
| 2018/0206132 A1* | 7/2018 | Guo .................... | H04B 7/02 |
| 2019/0020518 A1* | 1/2019 | Zhang ................. | H04W 72/04 |
| 2019/0356526 A1* | 11/2019 | Kuchi ................. | H04L 27/2613 |
| 2020/0136708 A1* | 4/2020 | Pan ..................... | H04B 7/0617 |
| 2020/0260526 A1* | 8/2020 | Xiong ................. | H04W 72/14 |

OTHER PUBLICATIONS

R1-1612490; Title: Discussion on SRS transmission in NR, Source: Samsung, 3GPP TSG RAN WG1 Meeting #87, Reno, USA Nov. 14-18, 2016. (Year: 2016).*
PCT International Application No. PCT/KR2017/001875, Written Opinion of the International Searching Authority dated Nov. 17, 2017, 23 pages.
Ericsson, "On SRS design", 3GPP TSG RAN WG1 Meeting #88, R1-1703222, Feb. 2017, 9 pages.
Huawei, et al., "Corrections on SRS Switching Parameters", 3GPP TSG RAN WG2 Meeting #97, R2-1701877, Feb. 2017, 3 pages.
European Patent Office Application Serial No. 17897579.3, Search Report dated Oct. 14, 2020, 6 pages.
Qualcomm Incorporated, "UL channelization in short UL duration", R1-1612073, 3GPP TSG-RAN WG1 #87, Nov. 2016, 8 pages.
Samsung, "Discussion on SRS transmission in NR", R1-1612490, 3GPP TSG RAN WG1 Meeting #87, Nov. 2016, 3 pages.

* cited by examiner

FIG. 10
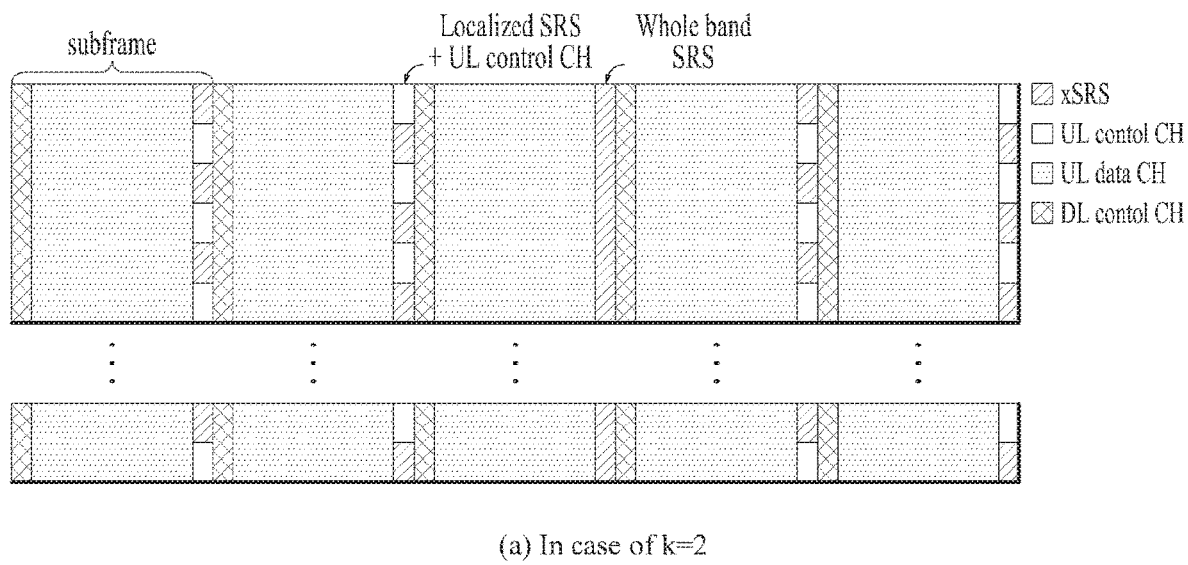
(a) In case of k=2
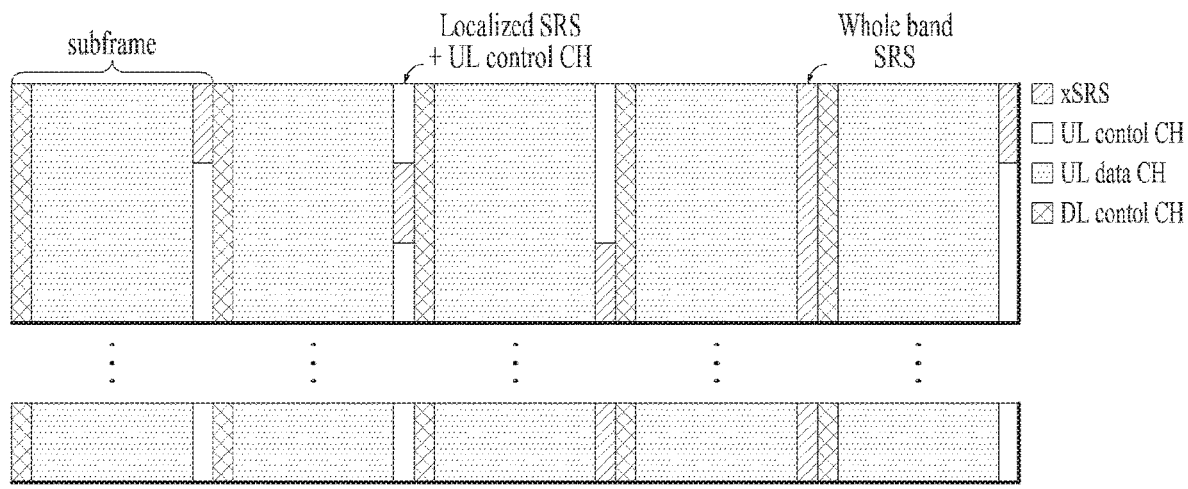
(b) In case of k=3

METHOD FOR TRANSMITTING SRS IN WIRELESS COMMUNICATION SYSTEM AND TERMINAL FOR SAME

CROSS-REFERENCE TO RELATED APPLICATIONS

This application is the National Stage filing under 35 U.S.C. 371 of International Application No. PCT/KR2017/001875, filed on Feb. 21, 2017, the contents of which are hereby incorporated by reference herein in its entirety.

TECHNICAL FIELD

The present disclosure relates to a wireless communication system, and more particularly, to a method of transmitting a sounding reference symbol (SRS) in a wireless communication system and terminal for the same.

BACKGROUND ART

With the introduction of a new radio access technology (RAT) system, as more and more communication devices require greater communication capacity, there is a need for mobile broadband communication enhanced over conventional Radio Access Technology (RAT). In addition, massive Machine Type Communications (MTC) capable of providing a variety of services anywhere and anytime by connecting multiple devices and objects is one of important issues to be considered in the next-generation communications. Communication system design considering services/UEs sensitive to reliability and latency is also under discussion. Thus, the new RAT is to provide services considering enhanced Mobile Broadband (eMBB) communication, massive MTC (mMTC), and Ultra-Reliable and Low Latency Communication (URLLC).

DISCLOSURE

Technical Problem

An object of the present disclosure is to provide a method for a terminal (or user equipment (UE)) to transmit an SRS.

Another object of the present disclosure is to provide a UE for transmitting an SRS in a wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, provided herein is a method of transmitting a sounding reference symbol (SRS) by a user equipment (UE) in a wireless communication system. The method may include: receiving, from a base station (BS), control information including a first instruction for instructing to transmit a localized SRS; and transmitting the localized SRS in a specific symbol based on the first instruction.

The control information may further include a second instruction for instructing to multiplex and transmit the localized SRS and an uplink control channel in the specific symbol. The localized SRS and the uplink control channel may be multiplexed and transmitted in the specific symbol based on the second instruction. The method may further include transmitting an uplink control channel or a whole-band SRS in a symbol adjacent to the specific symbol.

The control information may further include information on a starting position of the localized SRS in a frequency domain and information on a transmission bandwidth of the localized SRS, and the localized SRS may be transmitted in a frequency band indicated by the information on the starting position in the specific symbol and the information on the transmission bandwidth of the localized SRS.

The control information may further include information on a transmission starting position of the uplink control channel in a frequency domain, and the localized SRS and the uplink control channel may be multiplexed and transmitted in the specific symbol based on the information on the transmission starting position of the uplink control channel in the frequency domain.

A symbol-wise orthogonal cover code (OCC) may be applied to the uplink control channel transmitted in the specific symbol and the uplink control transmitted in the adjacent symbol.

The method may further include: receiving, from the BS, information on a localized SRS transmission pattern for preventing overlap between localized SRS transmission bands per subframe every a predetermined number of subframes; and when the localized SRS and an uplink control channel in the specific symbol are multiplexed and transmitted in the specific symbol of a first subframe, transmitting a localized SRS and an uplink control channel in a symbol of a second subframe having a same index as the specific symbol based on the information on the localized SRS transmission pattern.

In another aspect of the present disclosure, provide herein is a User Equipment (UE) for transmitting a sounding reference symbol (SRS) in a wireless communication system. The UE may include: a receiver; a transmitter; and a processor. The processor may be configured to control the receiver to receive, from a base station (BS), control information including a first instruction for instructing to transmit a localized SRS and control the transmitter to transmit the localized SRS in a specific symbol based on the first instruction.

The control information may further include a second instruction for instructing to multiplex and transmit the SRS and an uplink control channel in the specific symbol, and the processor may be configured to control the transmitter to transmit the multiplexed localized SRS and uplink control channel in the specific symbol based on the second instruction.

The processor may be configured to control the transmitter an uplink control channel or a whole-band SRS in a symbol adjacent to the specific symbol.

The control information may further include information on a starting position of the localized SRS in a frequency domain and information on a transmission bandwidth of the localized SRS, and the processor may be configured to control the transmitter to transmit the localized SRS in a frequency band indicated by the information on the starting position in the specific symbol and the information on the transmission bandwidth of the localized SRS.

The control information may further include information on a transmission starting position of the uplink control channel in a frequency domain, and the processor may be configured to control the transmitter to transmit the multiplexed localized SRS and uplink control channel in the specific symbol based on the information on the transmission starting position of the uplink control channel in the frequency domain.

The processor may be configured to control the transmitter to transmit the uplink channel transmitted in the specific symbol and the uplink control transmitted in the adjacent symbol by applying a symbol-wise orthogonal cover code thereto.

The processor may be configured to: control the receiver to receive, from the BS, information on a localized SRS transmission pattern for preventing overlap between localized SRS transmission bands per subframe every a predetermined number of subframes; and when the localized SRS and an uplink control channel in the specific symbol are multiplexed and transmitted in the specific symbol of a first subframe, control the transmitter to transmit the localized SRS and the uplink control channel in a symbol of a second subframe having a same index as the specific symbol based on the information on the localized SRS transmission pattern.

Advantageous Effects

According to embodiments of the present disclosure, localized SRS transmission can not only solve a UE's peak-to-average power ratio (PAPR) problem can be solved but also increase the degree of freedom for multiplexing of two or more different uplink channels. Therefore, the localized SRS transmission can be widely used in new RAT.

The effects that can be achieved through the embodiments of the present disclosure are not limited to what has been particularly described hereinabove and other effects which are not described herein can be derived by those skilled in the art from the following detailed description.

DESCRIPTION OF DRAWINGS

The accompanying drawings, which are included to provide a further understanding of the invention and are incorporated in and constitute a part of this specification, illustrate embodiments of the invention.

FIG. 10 is a diagram illustrating localized SRS transmission patterns.

BEST MODE

Figure 1:
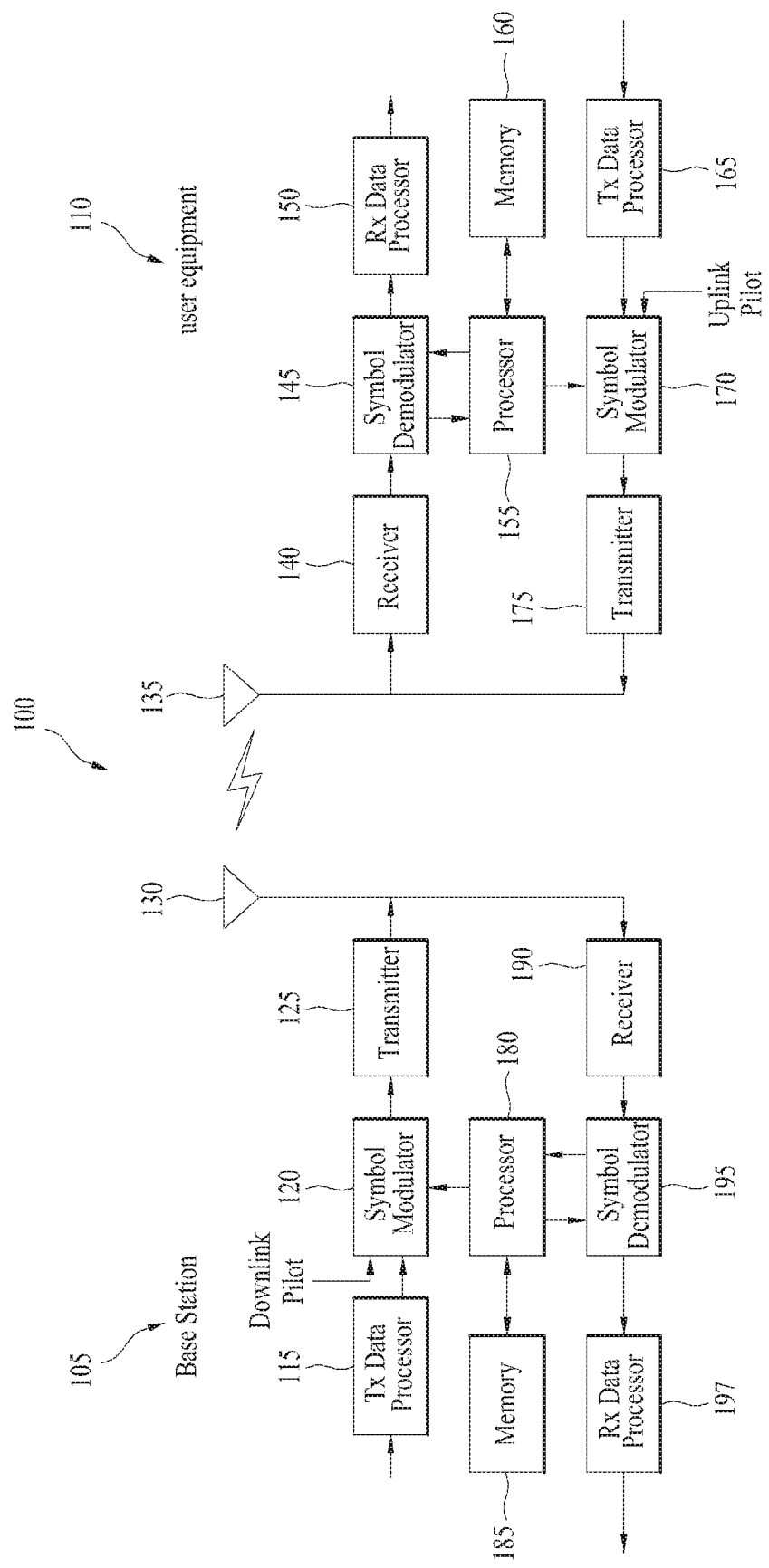
FIG. 1 is a block diagram for configurations of a base station 105 and a user equipment 110 in a wireless communication system 100.

Reference will now be made in detail to the preferred embodiments of the present disclosure, examples of which are illustrated in the accompanying drawings. In the following detailed description of the disclosure includes details to help the full understanding of the present disclosure. Yet, it is apparent to those skilled in the art that the present disclosure can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present disclosure may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc. UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE.

Moreover, in the following description, specific terminologies are provided to help the understanding of the present disclosure. And, the use of the specific terminology can be modified into another form within the scope of the technical idea of the present disclosure.

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present disclosure supports an MIMO (multiple input multiple output) system. And, the base station 105 according to the present disclosure may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present disclosure as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present disclosure using firmware or software, the firmware or software may be configured to include modules, procedures, and/or functions for performing the above-explained functions or operations of the present disclosure. And, the firmware or software configured to implement the present disclosure is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

For UE Tx beam tracking, a UE needs to transmit an SRS for each candidate Tx beam of the UE. However, if SRSs are transmitted toward many beam directions (in accordance with a UE's Tx beam set for all directions), it may result in significant resource waste. Accordingly, the present disclosure proposes a method of performing an adaptive UE Tx beam tracking by performing SRS transmission flexibly according to UE pattern changes.

First, Table 1 below shows details of SRS transmission in the 3GPP LTE/LTE-A system.

TABLE 1

A UE shall transmit Sounding Reference Symbol (SRS) on per serving cell SRS resources based on two trigger types:
trigger type 0: higher layer signalling
trigger type 1: DCI formats 0/4/1A for FDD and TDD and DCI formats 2B/2C/2D for TDD.
In case both trigger type 0 and trigger type 1 SRS transmissions would occur in the same subframe in the same serving cell, the UE shall only transmit the trigger type 1 SRS transmission.
A UE may be configured with SRS parameters for trigger type 0 and trigger type 1 on each serving cell. The following SRS parameters are serving cell specific and semi-statically configurable by higher layers for trigger type 0 and for trigger type 1.
Transmission comb $\bar{k}_{TC}$, as defined in subclause 5.5.3.2 of [3] for trigger type 0 and each configuration of trigger type 1
Starting physical resource block assignment $n_{RRC}$, as defined in subclause 5.5.3.2 of [3] for trigger type 0 and each configuration of trigger type 1
duration: single or indefinite (until disabled), as defined in [11] for trigger type 0
srs-ConfigIndex $I_{SRS}$ for SRS periodicity $T_{SRS}$ and SRS subframe offset $T_{offset}$, as defined in Table 8.2-1 and Table 8.2-2 for trigger type 0 and SRS periodicity $T_{SRS,1}$, and SRS subframe offset $T_{SRS,1}$, as defined in Table 8.2-4 and Table 8.2-5 trigger type 1
SRS bandwidth $B_{SRS}$, as defined in subclause 5.5.3.2 of [3] for trigger type 0 and each configuration of trigger type 1
Frequency hopping bandwidth, $b_{hop}$, as defined in subclause 5.5.3.2 of [3] for trigger type 0
Cyclic shift $n_{SRS}^{CS}$, as defined in subclause 5.5.3.1 of [3] for trigger type 0 and each configuration of trigger type 1
Number of antenna ports $N_p$ for trigger type 0 and each configuration of trigger type 1
For trigger type 1 and DCI format 4 three sets of SRS parameters, srs-ConfigApDCI-Format4, are configured by higher layer signalling. The 2-bit SRS request field [4] in DCI format 4 indicates the SRS parameter set given in Table 8.1-1. For trigger type 1 and DCI format 0, a single set of SRS parameters, srs-ConfigApDCI-Format0, is configured by higher layer signalling. For trigger type 1 and DCI formats 1A/2B/2C/2D, a single common set of SRS parameters, srs-ConfigApDCI-Format1a2b2c, is configured by higher layer signalling. The SRS request field is 1 bit [4] for DCI formats 0/1A/2B/2C/2D, with a type 1 SRS triggered if the value of the SRS request field is set to '1'.
A 1-bit SRS request field shall be included in DCI formats 0/1A for frame structure type 1 and 0/1A/2B/2C/2D for frame structure type 2 if the UE is configured with SRS parameters for DCI formats 0/1A/2B/2C/2D by higher-layer signalling.

Table 2 below shows SRS request values for trigger type 1 of DCI format 4 in the 3GPP LTE/LTE-A system.

TABLE 2

| Value of SRS request field | Description |
| --- | --- |
| '00' | No type 1 SRS trigger |
| '01' | The $1^{st}$ SRS parameter set configured by higher layers |
| '10' | The $2^{nd}$ SRS parameter set configured by higher layers |
| '11' | The $3^{rd}$ SRS parameter set configured by higher layers |

Table 3 below shows additional details of the SRS transmission in the 3GPP LTE/LTE-A system.

TABLE 3

The serving cell specific SRS transmission bandwidths $C_{SRS}$ are configured by higher layers. The allowable values are given in subclause 5.5.3.2 of [3].
The serving cell specific SRS transmission sub-frames are configured by higher layers.
The allowable values are given in subclause 5.5.3.3 of [3].
For a TDD serving cell, SRS transmissions can occur in UpPTS and uplink subframes of the UL/DL configuration indicated by the higher layer parameter subframe Assignment for the serving cell.
When closed-loop UE transmit antenna selection is enabled for a given serving cell for a UE that supports transmit antenna selection, the index $a(n_{SRS})$, of the UE antenna that transmits the SRS at time $n_{SRS}$ is given by $a(n_{SRS}) = n_{SRS} \bmod 2$, for both partial and full sounding bandwidth, and when frequency hopping is disabled (i.e., $b_{hop} \geq B_{SRS}$), $$a(n_{SRS}) = \begin{cases} (n_{SRS} + \lfloor n_{SRS}/2 \rfloor + \beta \cdot \lfloor n_{SRS}/K \rfloor) \bmod 2 & \text{when } K \text{ is even} \\ n_{SRS} \bmod 2 & \text{when K is odd} \end{cases},$$

$$\beta = \begin{cases} 1 & \text{where } k \bmod 4 = 0 \\ 0 & \text{otherwise} \end{cases}$$

when frequency hopping is enabled (i.e. $b_{hop} < B_{SRS}$), where values $B_{SRS}$, $b_{hop}$, $N_b$, and $n_{SRS}$ are given in subclause 5.5.3.2 of [3], and $$K = \prod_{b'=b_{hop}}^{B_{SRS}} N_t \left( \text{where } N_{b_{hop}} = 1 \right)$$

regardless of the $N_b$ value), except when a single SRS transmission is configured for the UE. If a UE is configured with more than one serving cell, the UE is not expected to transmit SRS on different antenna ports simultaneously.
A UE may be configured to transmit SRS on $N_p$ antenna ports of a serving cell where $N_p$ may be configured by higher layer signalling. For PUSCH transmission mode 1 $N_p \in \{0,1,2,4\}$ and for PUSCH transmission mode 2 $N_p \in \{0,1,2\}$ with two antenna ports configured for PUSCH and $N_p \in \{0,1,4\}$ with 4 antenna ports configured for PUSCH. A UE configured for SRS transmission on multiple antenna ports of a serving cell shall transmit SRS for all the configured transmit antenna ports within one SC-FDMA symbol of the same subframe of the serving cell. The SRS transmission bandwidth and starting physical resource block assignment are the same for all the configured antenna ports of a given serving cell.
A UE not configured with multiple TAGs shall not transmit SRS in a symbol whenever SRS and PUSCH transmissions happen to overlap in the same symbol.
For TDD serving cell, when one SC-FDMA symbol exists in UpPTS of the given serving cell, it can be used for SRS transmission. When two SC-FDMA symbols exist in UpPTS of the given serving cell, both can be used for SRS transmission and for trigger type 0 SRS both can be assigned to the same UE.
If a UE is not configured with multiple TAGs, or if a UE is configured with multiple TAGs and SRS and PUCCH format 2/2a/2b happen to coincide in the same subframe in the same serving cell, TABLE 3-continued The UE shall not transmit type 0 triggered SRS whenever type 0 triggered SRS and PUCCH format 2/2a/2b transmissions happen to coincide in the same subframe;
The UE shall not transmit type 1 triggered SRS whenever type 1 triggered SRS and PUCCH format 2a/2b or format 2 with HARQ-ACK transmissions happen to coincide in the same subframe;
The UE shall not transmit PUCCH format 2 without HARQ-ACK whenever type 1 triggered SRS and PUCCH format 2 without HARQ-ACK transmissions happen to coincide in the same subframe.
If a UE is not configured with multiple TAGs, or if a UE is configured with multiple TAGs and SRS and PUCCH happen to coincide in the same subframe in the same serving cell,
The UE shall not transmit SRS whenever SRS transmission and PUCCH transmission carrying HARQ-ACK and/or positive SR happen to coincide in the same subframe if the parameter ackNackSRS-SimultaneousTransmission is FALSE;
For FDD-TDD and primary cell frame structure 1, the UE shall not transmit SRS in a symbol whenever SRS transmission and PUCCH transmission carrying HARQ-ACK and/or positive SR using shortened format as defined in subclauses 5.4.1 and 5.4.2A of [3] happen to overlap in the same symbol if the parameter ackNackSRS-SimultaneousTransmission is TRUE.
Unless otherwise prohibited, the UE shall transmit SRS whenever SRS transmission and PUCCH transmission carrying HARQ-ACK and/or positive SR using shortened format as defined in subclauses 5.4.1 and 5.4.2A of [3] happen to coincide in the same subframe if the parameter ackNackSRS-SimultaneousTransmission is TRUE.
A UE not configured with multiple TAGs shall not transmit SRS whenever SRS transmission on any serving cells and PUCCH transmission carrying HARQ-ACK and/or positive SR using normal PUCCH format as defined in subclauses 5.4.1 and 5.4.2A of [3] happen to coincide in the same subframe.
In UpPTS, whenever SRS transmission instance overlaps with the PRACH region for preamble format 4 or exceeds the range of uplink system bandwidth configured in the serving cell, the UE shall not transmit SRS.
The parameter ackNackSRS-SimultaneousTransmission provided by higher layers determines if a UE is configured to support the transmission of HARQ-ACK on PUCCH and SRS in one subframe. If it is configured to support the transmission of HARQ-ACK on PUCCH and SRS in one subframe, then in the cell specific SRS subframes of the primary cell UE shall transmit HARQ-ACK and SR using the shortened PUCCH format as defined in subclauses 5.4.1 and 5.4.2A of [3], where the HARQ-ACK or the SR symbol corresponding to the SRS location is punctured.
This shortened PUCCH format shall be used in a cell specific SRS subframe of the primary cell even if the UE does not transmit SRS in that subframe. The cell specific SRS subframes are defined in subclause 5.5.3.3 of [3]. Otherwise, the UE shall use the normal PUCCH format 1/1a/1b as defined in subclause 5.4.1 of [3] or normal PUCCH format 3 as defined in subclause 5.4.2A of [3] for the transmission of HARQ-ACK and SR.
Trigger type 0 SRS configuration of a UE in a serving cell for SRS periodicity, $T_{SRS}$, and SRS subframe offset, $T_{offset}$, is defined in Table 8.2-1 and Table 8.2-2, for FDD and TDD serving cell, respectively. The periodicity $T_{SRS}$ of the SRS transmission is serving cell specific and is selected from the set $\{2, 5, 10, 20, 40, 80, 160, 320\}$ ms or subframes.
For the SRS periodicity $T_{SRS}$ of 2 ms in TDD serving cell, two SRS resources are configured in a half frame containing UL subframe(s) of the given serving cell.
Type 0 triggered SRS transmission instances in a given serving cell for TDD serving cell with $T_{SRS} > 2$ and for FDD serving cell are the subframes satisfying $(10 \cdot n_f + k_{SRS} - T_{offset}) \bmod T_{SRS} = 0$, where for FDD $k_{SRS} = \{0, 1, \ldots, 0\}$ is the subframe index within the frame, for TDD serving cell $k_{SRS}$ is defined in Table 8.2-3. The SRS transmission instances for TDD serving cell with $T_{SRS} = 2$ are the subframes satisfying $k_{SRS} - T_{offset}$.
For TDD serving cell, and a UE configured for type 0 triggered SRS transmission in serving cell c, and the UE configured with the parameter EIMTA-MainConfigServCell-r12 for serving cell c, if the UE does not detect an UL/DL configuration indication for radio frame m (as described in section 13.1), the UE shall not transmit trigger type 0 SRS in a subframe of radio frame m that is indicated by the parameter eimta-HarqReferenceConfig-r12 as a downlink subframe unless the UE transmits PUSCH in the same subframe.
Trigger type 1 SRS configuration of a UE in a serving cell for SRS periodicity, $T_{SRS,1}$, and SRS subframe offset, $T_{offset,1}$, is defined in Table 8.2-4 and Table 8.2-5, for FDD and TDD serving cell, respectively. The periodicity $T_{SRS,1}$ of the SRS transmission is serving cell specific and is selected from the set $\{2, 5, 10\}$ ms or subframes.
For the SRS periodicity $T_{SRS,1}$ of 2 ms in TDD serving cell, two SRS resources are configured in a half frame containing UL subframe(s) of the given serving cell.
A UE configured for type 1 triggered SRS transmission in serving cell c and not configured with a carrier indicator field shall transmit SRS on serving cell c upon detection of a positive SRS request in PDCCH/EPDCCH scheduling PUSCH/PDSCH on serving cell c.
A UE configured for type 1 triggered SRS transmission in serving cell c and configured with a carrier indicator field shall transmit SRS on serving cell c upon detection of a positive SRS request in PDCCH/EPDCCH scheduling PUSCH/PDSCH with the value of carrier indicator field corresponding to serving cell c.
A UE configured for type 1 triggered SRS transmission on serving cell c upon detection of a positive SRS request in subframe n of serving cell c shall commence SRS transmission in the first subframe satisfying $n + k$, $k \geq 4$ and $(10 \cdot n_f + k_{SRS} - T_{offset,1}) \bmod T_{SRS,1} = 0$ for TDD serving cell c with $T_{SRS,1} > 2$ and for FDD serving cell c, $(k_{SRS} - T_{offset,1}) \bmod 5 = 0$ for TDD serving cell c with $T_{SRS,1} = 2$ where for FDD serving cell c $k_{SRS} = \{0, 1, \ldots, 9\}$ is the subframe index within the frame $n_f$, for TDD serving cell c $k_{SRS}$ is defined in Table 8.2-3.
A UE configured for type 1 triggered SRS transmission is not expected to receive type 1 SRS triggering events associated with different values of trigger type 1 SRS transmission parameters, as configured by higher layer signalling, for the same subframe and the same serving cell.
For TDD serving cell c, and a UE configured with EIMTA-MainConfigServCell-r12 for a serving cell c, the UE shall not transmit SRS in a subframe of a radio frame that is indicated by the corresponding eIMTA-UL/DL-configuration as a downlink subframe.
A UE shall not transmit SRS whenever SRS and a PUSCH transmission corresponding to a Random Access Response Grant or a retransmission of the same transport block as part of the contention based random access procedure coincide in the same subframe.

Table 4 below shows the subframe offset configuration ($T_{offset}$) and UE-specific SRS periodicity ($T_{SRS}$) for trigger type 0 in FDD.

TABLE 4

| SRS Configuration Index $I_{SRS}$ | SRS Periodicity (ms) | SRS subframe Offset |
|---|---|---|
| 0-1 | 2 | $I_{SRS}$ |
| 2-6 | 5 | $I_{SRS}$ - 2 |
| 7-16 | 10 | $I_{SRS}$ - 7 |
| 17-36 | 20 | $I_{SRS}$ - 17 |
| 37-76 | 40 | $I_{SRS}$ - 37 |
| 77-156 | 80 | $I_{SRS}$ - 77 |
| 157-316 | 160 | $I_{SRS}$ - 157 |
| 317-636 | 320 | $I_{SRS}$ - 317 |
| 637-1023 | reserved | reserved |

Table 5 below shows the subframe offset configuration ($T_{offset}$) and UE-specific SRS periodicity ($T_{SRS}$) for trigger type 0 in TDD.

TABLE 5

| SRS Configuration Index $I_{SRS}$ | SRS Periodicity (ms) | SRS subframe Offset |
|---|---|---|
| 0-1 | 2 | $I_{SRS}$ |
| 2-6 | 5 | $I_{SRS}$ - 2 |
| 7-16 | 10 | $I_{SRS}$ - 7 |
| 17-36 | 20 | $I_{SRS}$ - 17 |
| 37-76 | 40 | $I_{SRS}$ - 37 |
| 77-156 | 80 | $I_{SRS}$ - 77 |
| 157-316 | 160 | $I_{SRS}$ - 157 |
| 317-636 | 320 | $I_{SRS}$ - 317 |
| 637-1023 | reserved | reserved |

TABLE 6

| SRS Configuration Index $I_{SRS}$ | SRS Periodicity (ms) | SRS subframe Offset |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$ - 10 |
| 15-24 | 10 | $I_{SRS}$ - 15 |
| 25-44 | 20 | $I_{SRS}$ - 25 |
| 45-84 | 40 | $I_{SRS}$ - 45 |
| 85-164 | 80 | $I_{SRS}$ - 85 |
| 165-324 | 160 | $I_{SRS}$ - 165 |
| 325-644 | 320 | $I_{SRS}$ - 325 |
| 645-1023 | reserved | reserved |

Table 7 shows $k_{SRS}$ for TDD.

TABLE 7

| | subframe index n | | | | | | | | | |
|---|---|---|---|---|---|---|---|---|---|---|
| | 1 | | | | | 6 | | | | |
| | 1st symbol of UpPTS | 2nd symbol of UpPTS | | | | 1st symbol of UpPTS | 2nd symbol of UpPTS | | | |
| | 0 | | 2 | 3 | 4 | 5 | | 7 | 8 | 9 |
| $k_{SRS}$ in case UpPTS length of 2 symbols | 0 | 1 | 2 | 3 | 4 | 5 | 6 | 7 | 8 | 9 |
| $k_{SRS}$ in case UpPTS length of 1 symbol | | 1 | 2 | 3 | 4 | | 6 | 7 | 8 | 9 |

Table 8 below shows the subframe offset configuration ($T_{offset,1}$) and UE-specific SRS periodicity ($T_{SRS,1}$) for trigger type 1 in FDD.

TABLE 8

| SRS Configuration Index $I_{SRS}$ | SRS Periodicity (ms) | SRS Subframe Offset |
|---|---|---|
| 0-1 | 2 | $I_{SRS}$ |
| 2-6 | 5 | $I_{SRS}$ - 2 |
| 7-16 | 10 | $I_{SRS}$ - 7 |
| 17-31 | reserved | reserved |

Table 9 below shows the subframe offset configuration ($T_{offset,1}$) and UE-specific SRS periodicity ($T_{SRS,1}$) for trigger type 1 in TDD.

TABLE 9

| SRS Configuration Index $I_{SRS}$ | SRS Periodicity (ms) | SRS Subframe Offset |
|---|---|---|
| 0 | reserved | reserved |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$ - 10 |
| 15-24 | 10 | $I_{SRS}$ - 15 |
| 25-31 | reserved | reserved |

Table 10 below shows additional channel variation characteristics (blockage effects) of a channel above 6 GHz compared to a channel below 6 GHz.

TABLE 10

| Ref. | Test description | Tx height | Rx height | Test frequency | Blockage rate relative parameter |
|---|---|---|---|---|---|
| [2] | One blocker moving (1 m/s) Horn (22.4 dBi, 12°) Patch (4.3 dBi/2.2 dBi, 58°) 4 blockers moving | 2.2/1.2 m | 1.2 m | 60 GHz | Series of Blockage event duration (threshold 5 dB) 780~1839 ms (Horn) 640~1539 ms (Patch) Series of Blockage event duration (threshold 5 dB) 688 ms (Horn, average) 278 ms (Patch, average) |
| [5] | 1~15 blockers moving The horns (22.4 dBi, 12° in azimuth, about 10° in elevation) The patches (about 3 dBi, 60° both in elevation and azimuth. The vertical polarization) | 1.58/2.77 m | 1.55 m | 60 GHz | Series of Blockage event duration (Threshold 10 dB) (Threshold 20 dB) 300 ms (1~5 persons)  100 ms (1~5 persons) 350 ms (6~10 persons) 150 ms (6~10 persons) 450 ms (11~15 persons) 300 ms (11~15 persons) |
| [6] | — | — | — | 60 GHz | 93 ms (Mean Drop Rate) |
| [7] | One blocker moving (Walking speed) 20 dBi, 10° | 1.1 m | 0.75 m | 67 GHz | $t_D$ = 230 ms (average, Threshold 20 dB) |

TABLE 10-continued

| Ref. | Test description | Tx height | Rx height | Test frequency | Blockage rate relative parameter |
|---|---|---|---|---|---|
| [8] | One blocker moving (Walking speed) 20 dBi, 10° | 1.1 m | 0.75 m | 67 GHz | $t_D$ = 370 ms~820 ms $t_{decay}$ = 230 ms (mean), 92 ms (s.d) (Threshold 20 dB) $t_{rising}$ = 220 ms (mean), 100 ms (s.d) (Threshold 20 dB) |

Figure 2A:
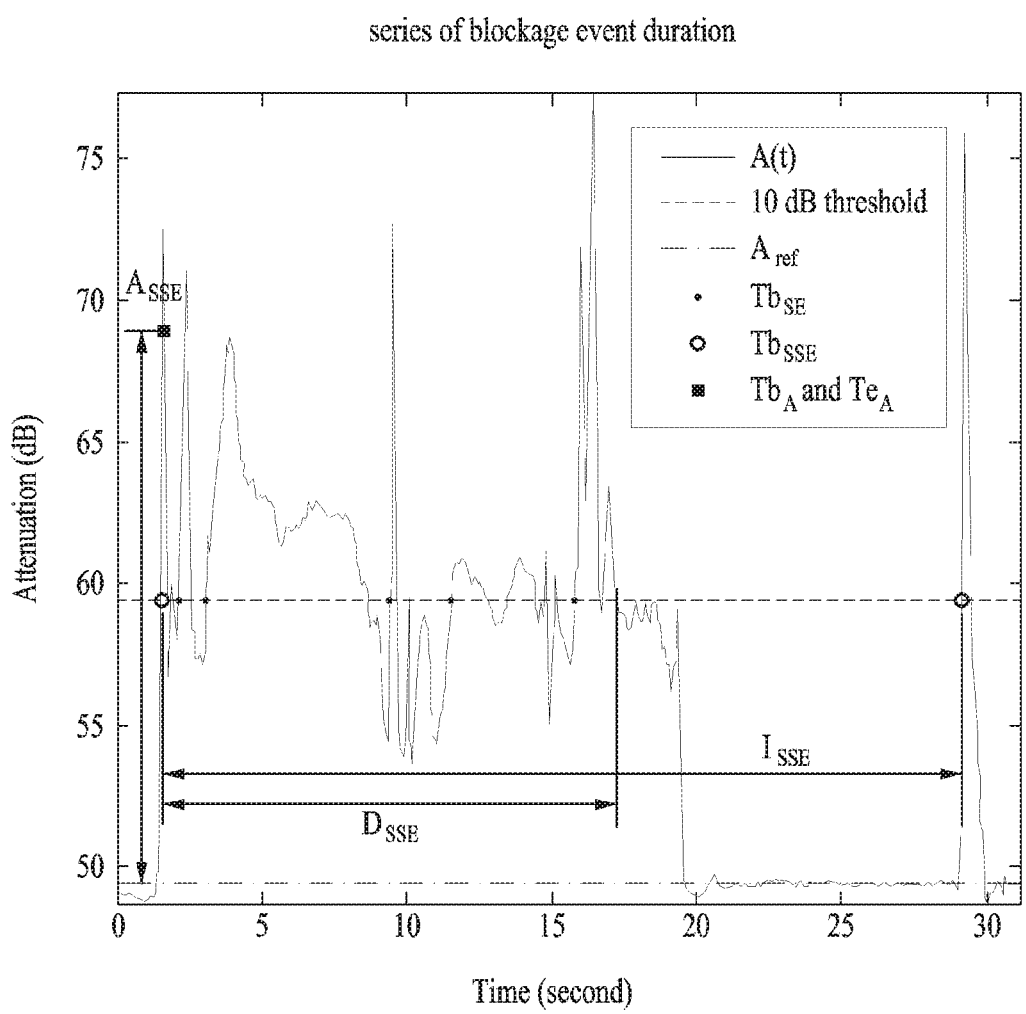
FIG. 2a shows the series of blockage event duration in Table 10 during which important blockages occur.
Figure 2B:
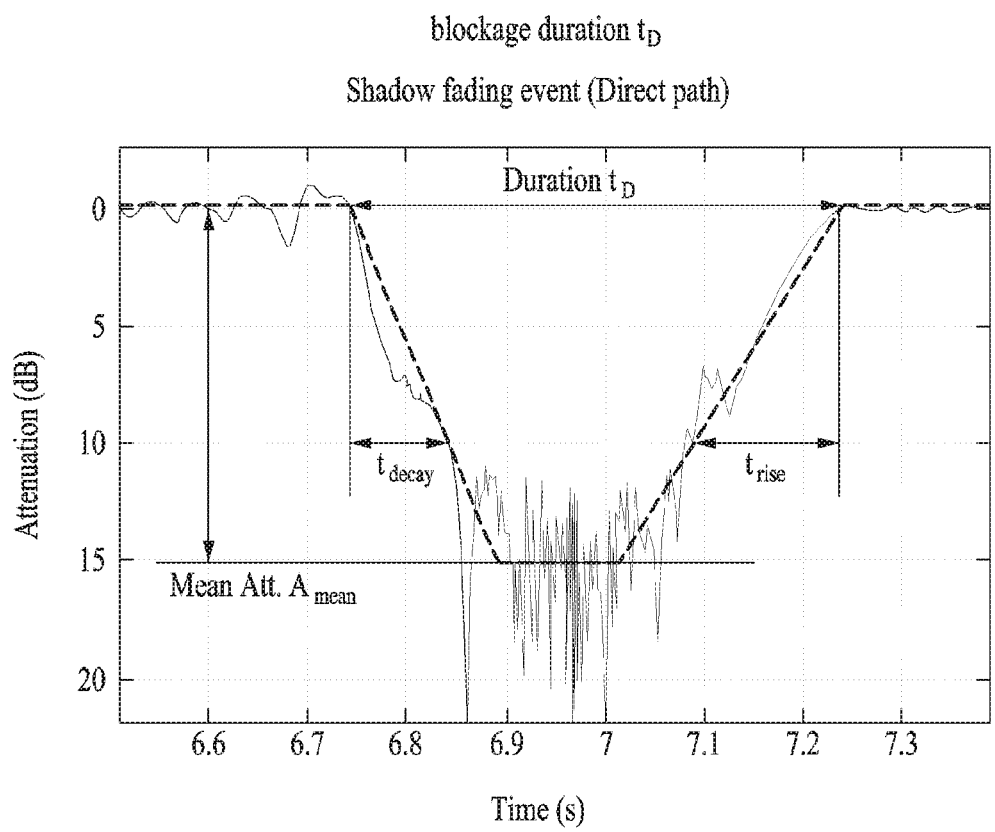
FIG. 2b shows the blockage duration ($t_D$) in Table 2.

FIG. 2 is a diagram illustrating blockage duration with reference to Table 10. Specifically, FIG. 2a shows the series of blockage event duration in Table 10 during which important blockages occur, and FIG. 2b shows the blockage duration ($t_D$) in Table 2. That is, the series of blockage event duration indicates the time during which important blockages occur, and $t_D$ indicates the period between occurrence of a blockage and the when blockage ends and the system goes back to a normal state.

Table 11 shows a pattern relationship between a UE and $t_{decay}$ and $t_{rising}$.

TABLE 11

| | Walking (0.6 m/s)[7] | Sprinting (10 m/s)[9] | Swift Hand swing (43 m/s) |
|---|---|---|---|
| $t_{decay}$, $t_{rising}$ (ms) | 150 ms (measure) | 9 ms (calculation) | 2.093 ms (calculation) |

Although Table 11 shows that a blockage change is basically estimated to about average 100 ms (the speed of a walking obstacle (4 km/h)), it can vary from 2 ms to hundreds of ms depending on UE's patterns and surrounding environments.

Necessity for Beam Tracking

Figure 3:
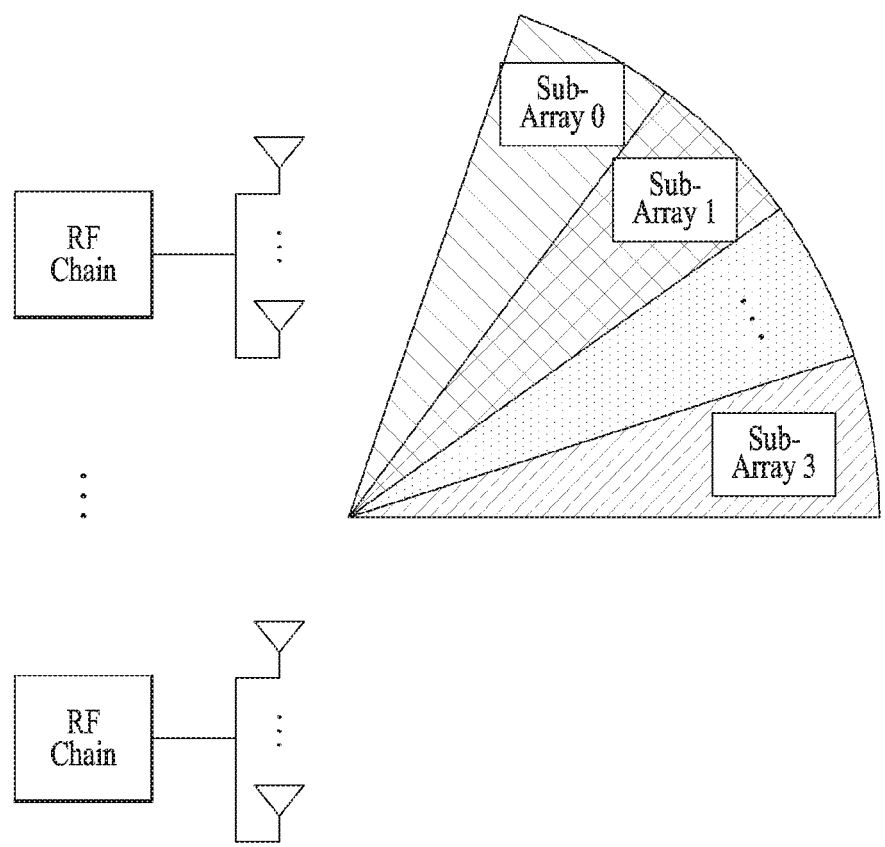
FIG. 3 is a diagram illustrating a wide beam composed of four narrow beams.

When multiple beams are properly placed, a wide beam can be defined as shown in FIG. 3.

FIG. 3 is a diagram illustrating a wide beam composed of four narrow beams.

Referring to FIG. 3, the wide beam is defined using four sub-arrays. The present disclosure assumes that a transmitter transmits a synchronization signal using the wide beam. In other words, it is assumed that the same Primary Synchronization Signal/Secondary Synchronization Signal/Physical Broadcast Channel (PSS/SSS/PBCH) is transmitted on all sub-arrays.

Meanwhile, when multiple beams are defined to cover a wide area, beam gain may decrease. To solve the above trade-off, additional power gain can be provided by repeating transmission in the time domain. Based on the repeated transmission, a structure of a synchronization subframe may be shown in FIG. 4.

Figure 4:
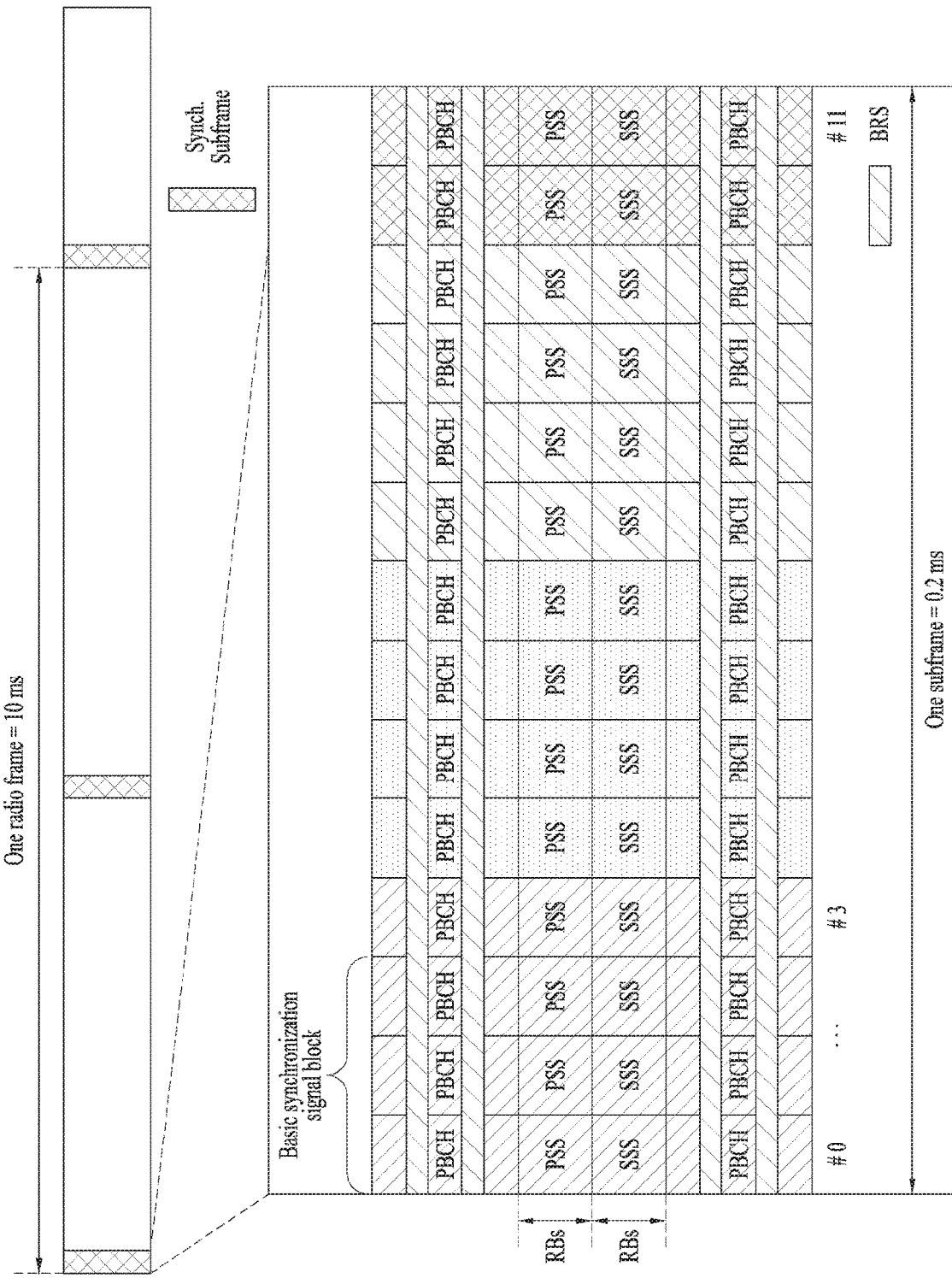
FIG. 4 is a diagram illustrating the structure of a synchronization subframe.

FIG. 4 is a diagram illustrating the structure of a synchronization subframe.

Specifically, FIG. 4 shows not only the structure of the synchronization subframe but also PSS/SSS/PBCH defined therein. In FIG. 4, blocks with the same type of hatching indicate a group of Orthogonal Frequency Division Multiplexing (OFDM) symbols where the same RF beam group (defined using four sub-array beams) is applied. That is, four OFDM symbols use the same multi-RF beam. In new RAT, based on the structure of FIG. 4, a beam scanning period can be generally configured as shown in FIG. 5.

Figure 5:
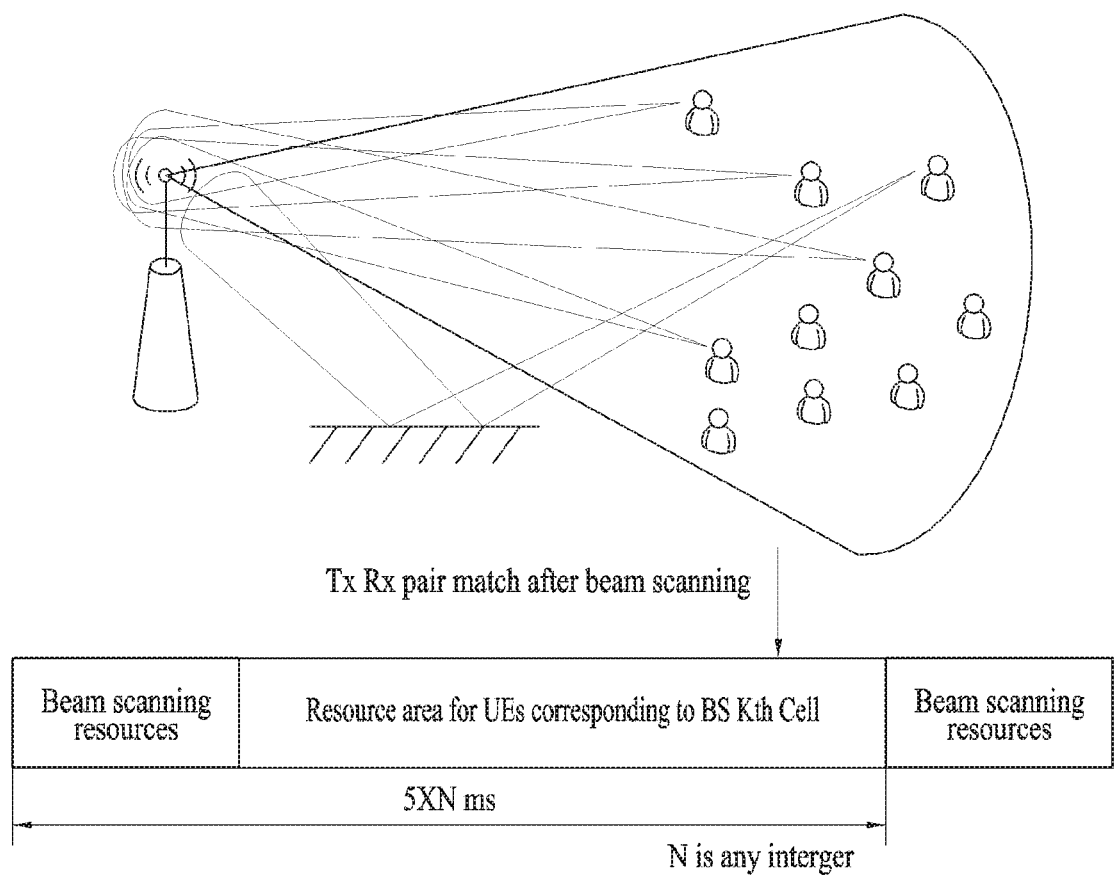
FIG. 5 is a diagram illustrating a beam scanning period and a resource area (for example, 5×N ms period).

FIG. 5 is a diagram illustrating a beam scanning period and a resource area (for example, 5×N ms period).

Since a beam scanning process basically has significant processing overhead, beam scanning cannot be completed within a very short period. In addition, the temporal variation of a channel above 6 GHz is expected to be much faster than that of a channel below 6 GHz due to the aforementioned additional channel elements. Moreover, in a cellular system, a Base Station (BS) may have a fixed beam configuration, whereas a UE may have different beams depending on serving cell locations, changes in its surrounding environment, UE behavior patterns, etc. That is, a Tx/Rx beam mismatch is highly likely to occur within a beam scanning period. To overcome the Tx/Rx beam mismatch, a beam tracking method is required.

In the case of downlink transmission, beam tracking can be performed by applying a UE Rx beam to each of the BRSs shown in FIG. 4 and measuring Reference Signal Received Power (RSRP) thereof. If reciprocity is established between Tx/Rx beam pairs (i.e., BS Tx beam/UE Rx beam pair and UE Tx beam/BS Rx beam pair) for downlink transmission, a Tx/Rx beam pair obtained from each BRS can be applied to uplink transmission. Otherwise, an SRS may be used for uplink transmission. To achieve the most powerful uplink beam tracking, SRSs should be transmitted for all Tx beam IDs of each UE. However, this SRS transmission may decrease a Physical Uplink Shared Channel (PUSCH) transmission region, and thus uplink throughput may decrease.

Figure 6:
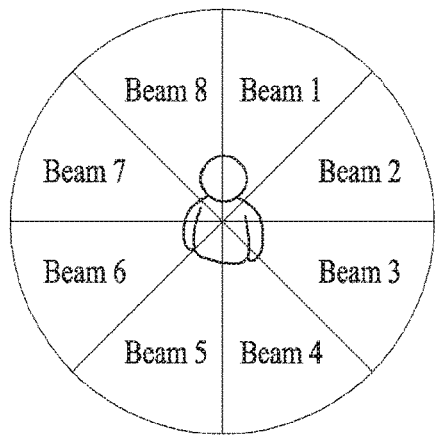
FIG. 6 is a diagram transmission of SRSs corresponding to UE beam IDs (the number of UE Tx beam IDs=8).

FIG. 6 is a diagram transmission of SRSs corresponding to UE beam IDs (the number of UE Tx beam IDs=8).

It can be seen from FIG. 6 that as the number of UE beam IDs increases, the SRS transmission region increases. If periodic SRS transmission is introduced to beam tracking for matching a pair of UE Tx beams and BS RX beams, that is, for establishing UE Tx/BS Rx beam pairs, the number of SRSs for fixed UE Tx candidate beams may be configured by higher layers (for example, a BS may inform the number of SRS transmissions for the fixed UE Tx candidate beams via higher layer signaling (e.g., RRC signaling)). However, if aperiodic SRS transmission is introduced, an additional SRS transmission region is required for additional UE Tx candidate beams. In addition, as the aperiodic SRS transmission is triggered by a UE or a BS, an SRS transmission configuration, which is generated for aperiodic beam tracking, may be presented differently in each beam tracking subframe. Moreover, signaling information for the beam tracking should be provided to UEs whenever the aperiodic SRS transmission is triggered. As a result, signaling overhead may increase. Therefore, a method of efficiently arranging an SRS transmission region and a PUSCH transmission region and a method of reducing signaling overhead thereof are required.

Figure 7:
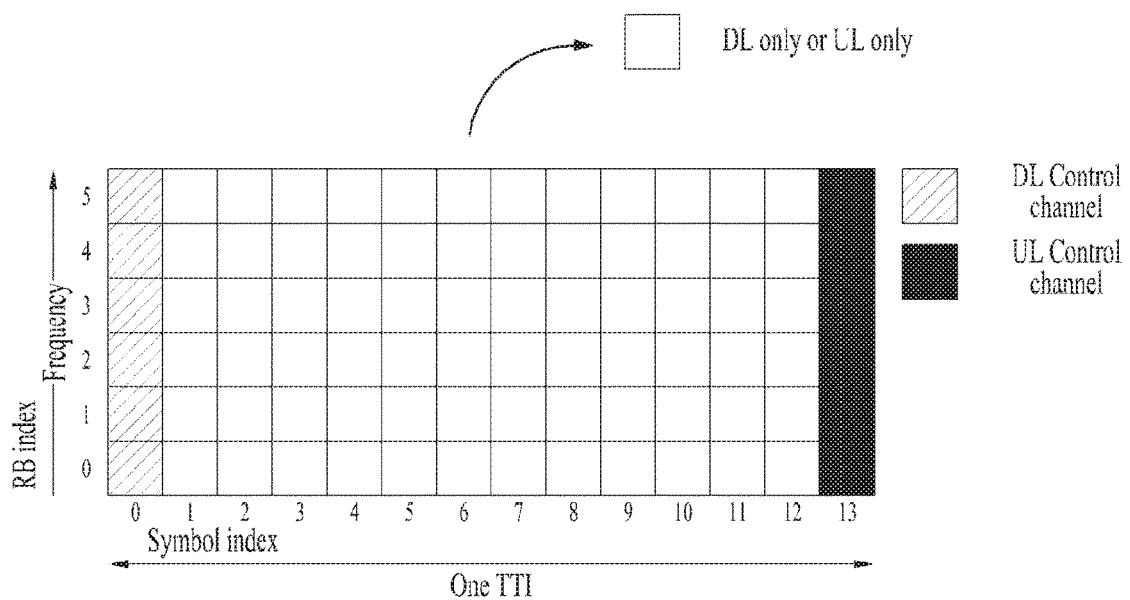
FIG. 7 is a diagram illustrating the structure of a subframe where TDM is applied to data and control channels.

FIG. 7 is a diagram illustrating the structure of a subframe where TDM is applied to data and control channels.

Specifically, FIG. 7 shows that TDM is applied to data and control channels in one subframe. In FIG. 7, the hatched area represents a Downlink (DL) control region (i.e., a resource region in which a DL control channel is transmitted), and the black area represents an Uplink (UL) control region (i.e., a resource region in which a UL control channel is transmitted). The unmarked area in the subframe of FIG. 7 can be used for DL or UL data transmission. According to this structure, it is possible to transmit DL data and receive UL ACK/NACK in a single subframe since DL transmission and UL transmission are sequentially performed in the single subframe. Consequently, when a data transmission error occurs, it is possible to reduce a time required until data is retransmitted, thereby minimizing the latency of the overall data transmission.

In the above subframe structure where the data and control channels are Time Division Multiplexed (TDMed), a time gap is required to allow a BS and a UE to switch from transmission mode to reception mode or vice versa. To this end, some Orthogonal Frequency Division Multiplexing (OFDM) symbols at the DL-to-UL switching time can be configured as a Guard Period (GP) in this subframe structure.

In FIG. 7, the hatched area represents a transmission region for a Physical Downlink Control Channel (PDCCH) carrying Downlink Control Information (DCI), and the last symbol is a transmission region for a Physical Uplink Control Channel (PUCCH) carrying Uplink Control Information (UCI). Here, the DCI corresponding to control information transmitted from an eNB (BS) to a UE may include information on a cell configuration that the UE should know, DL-specific information such as DL scheduling, UL-specific information such as a UL grant, etc. The UCI corresponding to control information transmitted from a UE to a BS may include an HARQ ACK/NACK report on DL data, a CSI report on a DL channel state, a Scheduling Request (SR), etc.

In FIG. 7, the unmarked area can be used for a data channel for transmitting DL data (e.g., Physical Downlink Shared Channel (PDSCH)) or a data channel for transmitting UL data (e.g., Physical Uplink Shared Channel (PUSCH)). According to this structure, an eNB (BS) can transmit DL data and receive an HARQ ACK/NACK signal from a UE in response to the DL data in a single subframe since DL transmission and UL transmission are sequentially performed in the single subframe. Consequently, when a data transmission error occurs, it is possible to reduce a time taken until data retransmission, thereby minimizing the latency of the overall data transmission.

In such a self-contained subframe structure, a time gap is required to allow a BS and a UE to switch from transmission mode to reception mode or vice versa. To this end, some OFDM symbols at the DL-to-UL switching time can be configured as a GP in this self-contained subframe structure.

In the new RAT system, the following four subframe types may be considered as examples of configurable self-contained subframe types. In the four subframe types, individual regions are arranged within a subframe in time order.
1) DL control region+DL data region+GP+UL control region
2) DL control region+DL data region
3) DL control region+GP+UL data region+UL control region
4) DL control region+GP+UL data region In new RAT, UL design for mitigating a peak-to-average power ratio (PAPR) problem can be considered owing to small cell coverage, UL OFDM, etc. In addition, if each UE performs SRS transmission over the whole band (in the new RAT, an SRS may be represented as an xSRS), a new RAT BS may fail in SRS detection due to limited transmission power. Considering the configurations of localized SRS transmission and full-band SRS transmission from the perspective of UE transmission power, it is expected that the localized SRS transmission is performed more times. For the above-described two reasons, that is, due to the mitigation of the PAPR problem and the localized SRS transmission, a UE is allowed to perform multiplexing of two or more different UL channels more freely.

When two or more UL channels are multiplexed, inter-cell interference may occur due to different UL channel configurations between neighboring cells. If the same channel is configured on the same resource (k, l) in each cell, each cell may easily detects its UL channel by applying different cyclic shifts to UL channels. However, if the resources of a UL channel overlaps with those of another UL channel with a different sequence or signal, its detection is not easy. Accordingly, the most important issue in multiplexing different UL channels is that when different cells have different UL channel transmission configurations, resource allocation locations should not overlap with each other to reduce inter-cell interference, or when different channel sequences or signals are generated, if the sequences or signals have the same format, each BS becomes capable of detecting the channels although they overlap with each other.

Figure 8:
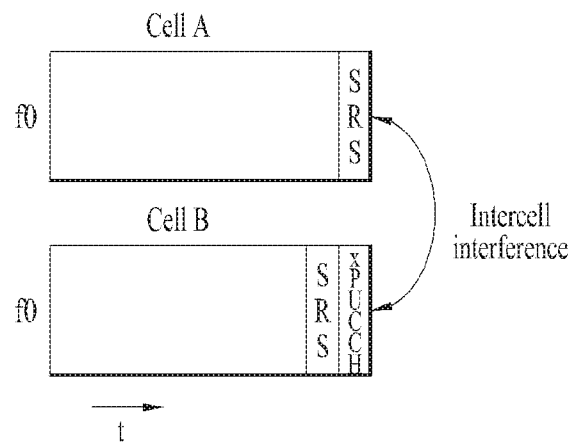
FIG. 8 is a diagram illustrating interference caused by different UL resource configurations between cells.

FIG. 8 is a diagram illustrating interference caused by different UL resource configurations between cells.

As shown in FIG. 8, inter-cell interference may occur between an SRS and a physical UL channel (xPUCCH) due to the SRS configuration of cell A and the xPUCCH configuration of cell B. To cancel the inter-cell interference, the following method may be applied.

1) An SRS and xPUCCH formats 1, 1a, and 1b are designed using a Zadoff Chu (ZC) sequence.

$$r_{u,v}^{(\alpha)}(n) = e^{j\alpha n} \bar{r}_{u,v}(n), 0 \le n < M_{sc}^{RS}$$

2) In each channel (i.e., an SRS, an xPUCCH, etc.), u for configuring the root of the ZC sequence is determined using a different group hopping method.

$$u=(f_{gh}(n_s)+f_{ss}) \bmod 30, \text{ where } f_{ss}^{xPUCCH}=n_{ID}^{RS} \bmod 30, f_{ss}^{SRS}=n_{ID}^{RS} \bmod 30$$

3) xPUCCH:
$n_{ID}^{RS}=N_{ID}^{cell}$ if no value for $n_{ID}^{xPUCCH}$ is configured by higher layers,
$n_{ID}^{RS}=n_{ID}^{xPUCCH}$ otherwise.

Sounding reference signals:
$n_{ID}^{RS}=N_{ID}^{cell}$ if no value for $n_{ID}^{xSRS}$ is configured by higher layers, $n_{ID}^{RS}=n_{ID}^{xSRS}$ otherwise.

According to this method, each BS may detect individual channels by detecting different ZC sequences from an SRS and an xPUCCH even though inter-cell interference exists between the SRS and xPUCCH. However, the method is available when different channels use sequences satisfying the orthogonality condition. In particular, if the resources of an SRS overlap with those of another channel, for example, an xPUCCH format (e.g., xPUCCH format 2) in terms of signal generation, inter-cell interference may occur, and as a result, performance may be degraded. In the following embodiments, various methods are proposed to solve such a problem.

Embodiment 1

In Embodiment 1, provided is a method of configuring a parameter for using a localized SRS and multiplexing the localized SRS with another UL channel.

A BS may transmit to a UE a Cell-specific Localized SRS Enable flag over a cell-specific physical DL control channel (e.g., xPDCCH) or through higher layer signaling. In addition, the BS may transmit to the UE a flag indicating that multiplexing of an SRS and another UL channel is determined or performed over a UE-specific physical DL control channel (e.g., xPDCCH) or through higher layer signaling.

The BS may also transmit to the UE a UE-specific Localized SRS Enable flag over a UE-specific physical DL control channel (xPDCCH) or through higher layer signaling. Based on an indicator (i.e., Localized SRS Enable flag) indicating whether each UE needs to transmit a localized SRS or a normal SRS (including whole band transmission), the UE transmits either the localized SRS or the normal SRS (including the whole band transmission). For example, when the Localized SRS Enable flag is enabled, the UE transmits the localized SRS.

Location of localized SRS starting resource element (RE) or resource block (RB) ($K_{localized\_SRS}^{(p)}$) (for example, the starting location of the localized SRS in the frequency domain): The BS may determine the location of the starting RE or RB of the localized SRS and then inform the UE of the location on a specific antenna port (e.g., antenna port index p) over a cell-specific xPDCCH or through higher layer signaling.

Localized SRS bandwidth configuration: The BS may transmit to the UE information on the configuration of a localized SRS transmission bandwidth over a UE-specific xPDCCH or through higher layer signaling. As a fraction of the entire UL system bandwidth, the localized SRS transmission bandwidth can be represented as follows:

$$B_{localized\_SRS} = \left\lfloor \frac{B_{sys}}{M} \right\rfloor,$$

where M is an integer.

When multiplexing of the SRS and the other UL channel is determined, the BS may transmit the transmission location ($K_{localized\_xPUCCH}^{(p)}$) of the localized SRS, which is to be transmitted on a specific antenna port over a channel (e.g., xPUCCH), to the UE through an xPDCCH or through higher layer signaling.

Table 12 below shows the localized SRS bandwidth configuration.

TABLE 12

| SRS bandwidth configuration $C_{localized\_SRS}$ | SRS-Bandwidth $B_{localized\_SRS} = 0$ $m_{SRS,0}$ | SRS-Bandwidth $B_{localized\_SRS} = 1$ $m_{SRS,1}$ | SRS-Bandwidth $B_{localized\_SRS} = 2$ $m_{SRS,2}$ | SRS-Bandwidth $B_{localized\_SRS} = 3$ $m_{SRS,3}$ |
|---|---|---|---|---|
| 0 | 24 | 12 | 6 | 3 |
| 1 | 16 | 8 | 4 | 2 |

Figure 9:
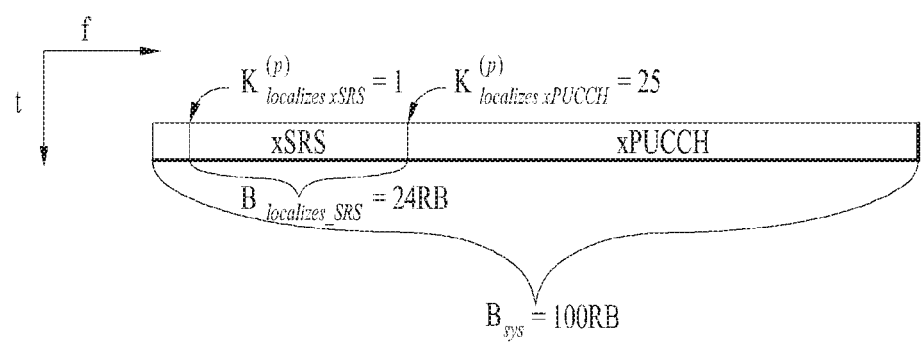
FIG. 9 is a diagram illustrating multiplexing of an xPUCCH and a localized SRS in the case of localized SRS transmission.

FIG. 9 is a diagram illustrating multiplexing of an xPUCCH and a localized SRS in the case of localized SRS transmission.

For example, assuming that the Cell-specific Localized SRS Enable flag is enabled, $K_{localized\_SRS}^{(p)}$=1 RB (i.e., RB index 1), $C_{localized\_SRS}$ (localized SRS bandwidth configuration)=0, and $K_{localized\_xPUCCH}^{(p)}$=25 RB (i.e., RB index 25), an SRS can be multiplexed with an xPUCCH as shown in FIG. 9.

As shown in FIG. 9, when the localized SRS is enabled, a UE may be allocated an SRS resource and an xPUCCH resource at the same time, multiplex the SRS and the xPUCCH, and then transmit the multiplexed SRS and xPUCCH to a BS.

Embodiment 2: Subframe Structure where Localized SRS and Whole-Band SRS are Transmitted In Embodiment 2, provided is a subframe structure for transmitting a localized SRS and a whole-band SRS. In Embodiment 2-1, which is a sub-embodiment of Embodiment 2, provided is a method by which a BS informs each UE of the location of a localized SRS in a subframe including the localized SRS and a UL control channel in advance using a physical DL channel or through higher layer signaling by considering reciprocity with a DL channel.

According to Embodiment 2-2, which is another sub-embodiment of Embodiment 2, when localized SRS transmission is configured in subframe #n, the locations of localized SRSs in n-th to k-th subframes may be configured according to a pattern. In this case, a BS may inform a UE of the value of k over a physical layer channel or through higher layer signaling. Information on the localized SRS location pattern in the n-th to k-th subframes may be pre-shared by the BS and UE. Alternatively, the BS may transmit the information to the UE.

TABLE 13

| k | n | n + 1 | n + 2 | n + 3 |
|---|---|---|---|---|
| 2 | Odd | Even | — | — |
| 3 | α | α + 1 | α + 2 | — |
| 4 | α | α + 1 | α + 2 | α + 3 |

$$\arg_\alpha \frac{N_{RB}^{UL}}{N_{sb}^{SRS}}$$

is 0. In this case, $N_{sb}^{SRS}$=m·X may be configured on an RB basis, an RE basis, or a predetermined unit basis (where m is an integer).

FIG. 10 is a diagram illustrating localized SRS transmission patterns.

In particular, FIG. 10 (a) shows a localized SRS transmission pattern in the case of k=2, and FIG. 10 (b) shows a localized SRS transmission pattern in the case of k=3.

According to the patterns shown in FIG. 10, even if a UE intends to transmit a localized SRS in subframe #n, it is not necessary to allocate localized SRSs to subframe #n+k for the corresponding UE. As shown in FIG. 10 (a), the localized SRS transmission pattern may be configured such that frequency resources for localized SRS transmission allocated to a first subframe (subframe #n) do not overlap with those allocated to a second subframe (subframe #n+1). As shown in FIG. 10 (b), the localized SRS transmission pattern may be configured such that frequency resources for localized SRS transmission allocated to a first subframe (subframe #n), a second subframe (subframe #n+1), and a third subframe (subframe #n) do not overlap with each other.

According to the above method, UE power is concentrated on a specific frequency resource or a frequency resource region preferred by a UE in order to allocate desired UL data resources, thereby improving the SRS detection capability of a BS and achieving the efficient use of SRS resources and UL control channel resources.

Embodiment 3

In Embodiment 3, provided is a subframe structure where a whole-band SRS, a localized SRS, and a UL control channel are transmitted all together.

Figure 11:
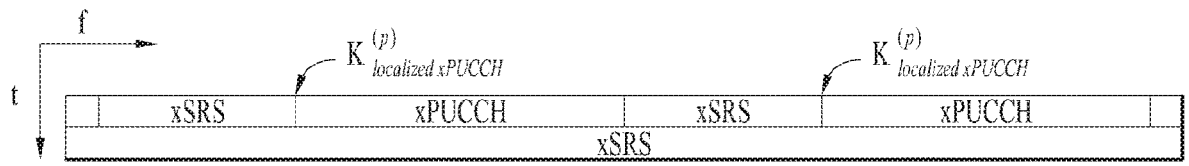
FIG. 11 is a diagram illustrating the concatenation of a symbol for whole-band SRS transmission, a symbol for localized SRS transmission, and a symbol for localized xPUCCH transmission.

FIG. 11 is a diagram illustrating the concatenation of a symbol for whole-band SRS transmission, a symbol for localized SRS transmission, and a symbol for localized xPUCCH transmission.

Specifically, FIG. 11 shows Embodiment 3-1, a sub-embodiment of Embodiment 3. In Embodiment 3-1, it is proposed that when a localized SRS, a whole-band SRS, and a UL control channel are configured by a BS to be transmitted together in subframe #n, if the whole-band SRS is configured to be transmitted in symbol #k, the localized SRS and UL control channel are transmitted in symbol #k+l or #k−l. In this case, l is an integer (for example, l=1 or 2), and in particular, l is set to a small integer by considering channel aging. FIG. 11 shows that the localized SRS and UL control channel are transmitted together in symbol #k−l.

Figure 12:
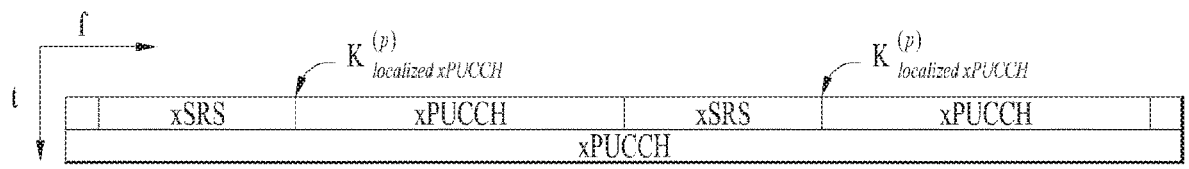
FIG. 12 is a diagram illustrating the concatenation of a symbol for xPUCCH transmission, a symbol for localized SRS transmission, and a symbol for localized xPUCCH transmission.

FIG. 12 is a diagram illustrating the concatenation of a symbol for xPUCCH transmission, a symbol for localized SRS transmission, and a symbol for localized xPUCCH transmission.

In Embodiment 3-2, which is another sub-embodiment of Embodiment 3, it is proposed that when a localized SRS, a whole-band SRS, and an xPUCCH are configured by a BS to be transmitted together in subframe #n, if the whole-band xPUCCH is configured to be transmitted in symbol #k, the localized SRS and the localized xPUCCH are configured to be transmitted in symbol #k+l or #k−l.

Embodiment 4

In the subframe structure of Embodiment 3, a symbol-wise orthogonal cover code (OCC) may be applied to control channels on consecutive or neighboring symbols by considering the frequency-domain OCC (e.g., Walsh code, DFT vector, etc.). The operation of applying an OCC to control channels on consecutive or neighboring symbols may be performed by the following UEs.

Figure 13:
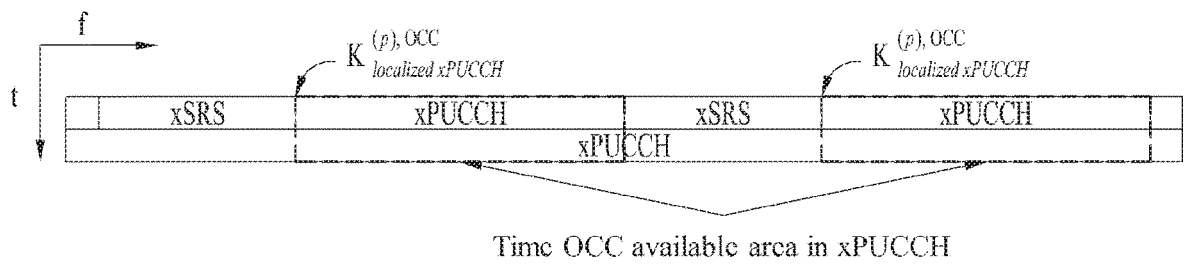
FIG. 13 is a diagram illustrating a time OCC available area in an xPUCCH when an xPUCCH symbol, a localized SRS symbol, and a localized xPUCCH symbol are concatenated.

- UEs that are located at the edge of a cell and require the extension of cell coverage
- UEs that require the improvement of channel reception performance to receive a UL control channel (e.g., UEs having severe frequency-selective fading on resources allocated for a UL control channel, UEs suffering from a decrease in reception power due to a sudden blockage, etc.)
- UEs instructed by a BS to use allocated resources for a UL control channel FIG. 13 is a diagram illustrating a time OCC available area in an xPUCCH when an xPUCCH symbol, a localized SRS symbol, and a localized xPUCCH symbol are concatenated.

As shown in FIG. 13, the location of an xPUCCH starting symbol, $K_{localized\_xPUCCH}^{(p),OCC}$ in symbol #k of subframe #n may be configured for a UE. It is assumed that the frequency-domain OCC of [1, 1, 1, 1] is generated over 4 REs in symbol #k. If a localized SRS and xPUCCH are configured in symbol #k−1 and the frequency-domain OCC for the xPUCCH is set to [1, 1, −1, −1], the symbol-wise OCC, w(i) is determined according to how a BS and a UE use the xPUCCH. If two consecutive xPUCCH symbols are bundled, w(i) may be set to [1 1] to increase reception power in first two REs, or it may be set to [−1 1] to increase reception power in last two REs.

When the xPUCCH symbol is consecutive or adjacent to the localized SRS and xPUCCH symbols, if the symbol-wise OCC is applied to adjacent xPUCCHs symbols, the received power of the xPUCCH may increase so that the xPUCCH reception performance of the BS may be improved.

As described above, the localized SRS transmission may not only solve the UE's PAPR problem but also increase the degree of freedom for multiplexing of two or more different UL channels. Therefore, the localized SRS transmission can be widely used in the new RAT.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The method of transmitting an SRS in a wireless communication system and terminal for the same can be applied to various wireless communication systems including the 3GPP LTE/LTE-A system, the 5G communication system, etc.

What is claimed is:

1. A method of transmitting a sounding reference symbol (SRS) by a user equipment (UE) in a wireless communication system, the method comprising:
receiving, from a base station (BS), control information including first information and second information wherein the first information informs whether to transmit a localized SRS or whole-band SRS, and the second information informs to multiplex the localized SRS and a localized uplink control channel in a specific symbol;

transmitting the localized SRS and the localized uplink control channel in the specific symbol based on the first information informing of transmitting the localized SRS and the second information; and transmitting a whole-band uplink control channel in a symbol adjacent to the specific symbol, wherein a bandwidth of the whole-band SRS is an integer multiple of a bandwidth of the localized SRS, wherein a symbol-wise orthogonal cover code (OCC) is applied to the localized SRS transmitted in the specific symbol and the localized uplink control channel transmitted in the adjacent symbol based on the UE being located at an edge of a cell, and wherein the control information further includes information on a transmission starting position of the localized uplink control channel in a frequency domain, and wherein the localized SRS and the localized uplink control channel are multiplexed and transmitted in the specific symbol based on the information on the transmission starting position of the localized uplink control channel in the frequency domain.

2. The method of claim 1, wherein the control information further includes information on a starting position of the localized SRS in the frequency domain and information on the bandwidth of the localized SRS, and wherein the localized SRS is transmitted in a frequency band indicated by the information on the starting position in the specific symbol and the information on the bandwidth of the localized SRS.

3. The method of claim 1, further comprising:

receiving, from the BS, information on the localized SRS transmission pattern for preventing overlap between localized SRS transmission bands per subframe every predetermined number of subframes; and when the localized SRS and the localized uplink control channel in the specific symbol are multiplexed and transmitted in the specific symbol of a first subframe, transmitting a second localized SRS and a third uplink control channel in a symbol of a second subframe having a same index as the specific symbol based on the information on the localized SRS transmission pattern.

4. A User Equipment (UE) for transmitting a sounding reference symbol (SRS) in a wireless communication system, the UE comprising:

a transceiver coupled to at least one processor; and the at least one processor configured to:

receive, from a base station (BS), control information including first information and second information, wherein the first information informs whether to transmit a localized SRS or a whole-band SRS, and the second information informs to multiplex the localized SRS and a localized uplink control channel in a specific symbol, and transmit the localized SRS and the localized uplink control channel in the specific symbol based on the first information informing of transmitting the localized SRS and the second information; and transmit a whole-band uplink control channel in a symbol adjacent to the specific symbol, wherein a bandwidth of the whole-band SRS is an integer multiple of a bandwidth of the localized SRS, wherein a symbol-wise orthogonal cover code (OCC) is applied to the localized SRS transmitted in the specific symbol and the localized uplink control channel transmitted in the adjacent symbol based on the UE being located at an edge of a cell, wherein the control information further includes information on a transmission starting position of the localized uplink control channel in a frequency domain, and wherein the at least one processor is further configured to transmit the multiplexed localized SRS and localized uplink control channel in the specific symbol based on the information on the transmission starting position of the localized uplink control channel in the frequency domain.

5. The UE of claim 4, wherein the control information further includes information on a starting position of the localized SRS in the frequency domain and information on the bandwidth of the localized SRS, and wherein the at least one processor is further configured to transmit the localized SRS in a frequency band indicated by the information on the starting position in the specific symbol and the information on the bandwidth of the localized SRS.

6. The UE of claim 4, wherein the at least one processor is further configured to:

receive, from the BS, information on the localized SRS transmission pattern for preventing overlap between localized SRS transmission bands per subframe every predetermined number of subframes, and when the localized SRS and the first localized control channel in the specific symbol are multiplexed and transmitted in the specific symbol of a first subframe, control the transmitter to transmit a second localized SRS and a third uplink control channel in a symbol of a second subframe having a same index as the specific symbol based on the information on the localized SRS transmission pattern.

* * * * *